US008285297B2

(12) United States Patent
Chu et al.

(10) Patent No.: US 8,285,297 B2
(45) Date of Patent: *Oct. 9, 2012

(54) FAIR CHANNEL USE IN A WIRELESS AREA NETWORK

(75) Inventors: Liwen Chu, San Jose, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,580

(22) Filed: Sep. 23, 2011

(65) Prior Publication Data

US 2012/0026883 A1    Feb. 2, 2012

Related U.S. Application Data

(63) Continuation of application No. 12/035,368, filed on Feb. 21, 2008, now Pat. No. 8,045,993.

(60) Provisional application No. 60/891,122, filed on Feb. 22, 2007.

(51) Int. Cl.
*H04W 72/00* (2009.01)
*H04W 4/00* (2009.01)

(52) U.S. Cl. ............... 455/452.2; 455/453; 370/329

(58) Field of Classification Search .......... 455/450, 455/451, 452.1, 452.2, 453; 370/329
See application file for complete search history.

(56) References Cited

U.S. PATENT DOCUMENTS

| 5,625,626 | A | 4/1997 | Umekita |
|---|---|---|---|
| 5,805,633 | A | 9/1998 | Uddenfeldt |
| 5,862,142 | A | 1/1999 | Takiyasu et al. |
| 6,275,518 | B1 | 8/2001 | Takahashi et al. |
| 6,496,498 | B1 | 12/2002 | Kockmann et al. |
| 6,744,743 | B2 | 6/2004 | Walton et al. |
| 6,763,230 | B2 | 7/2004 | Cheng |
| 6,888,819 | B1 | 5/2005 | Mushkin et al. |
| 7,002,927 | B2 | 2/2006 | Guruprasad |
| 7,024,165 | B2 | 4/2006 | Stepp et al. |
| 7,171,160 | B2 | 1/2007 | Chuah et al. |
| 7,280,836 | B2 | 10/2007 | Fuccello et al. |
| 7,508,781 | B2 | 3/2009 | Liu et al. |
| 7,609,641 | B2 | 10/2009 | Strutt et al. |
| 7,701,910 | B2 | 4/2010 | Yoon et al. |
| 7,710,919 | B2 | 5/2010 | Woo et al. |
| 7,729,696 | B2 | 6/2010 | Harris et al. |
| 7,813,326 | B1 | 10/2010 | Kelm et al. |
| 7,948,930 | B2 | 5/2011 | Rhee |
| 7,983,703 | B2 | 7/2011 | Chu |
| 2002/0009067 | A1 | 1/2002 | Sachs et al. |
| 2002/0052206 | A1 | 5/2002 | Longoni |
| 2002/0062388 | A1 | 5/2002 | Ogier et al. |
| 2003/0013451 | A1 | 1/2003 | Walton |
| 2003/0033394 | A1 | 2/2003 | Stine |

(Continued)

OTHER PUBLICATIONS

Chun-Chuan Yang, and Li-Pin Tseng, "Fisheye Zone Routing Protocol for Mobile Ad Hoc Networks," IEEE 2004.

(Continued)

*Primary Examiner* — Christopher M Brandt
(74) *Attorney, Agent, or Firm* — Hogan Lovells US LLP

(57) ABSTRACT

Fair usage of working channels in a wireless network is disclosed. A base station associated with a cell within a wireless community monitors the congestion of the working channel of neighboring communities. Upon determining that the congestion of the working channel of a neighboring community is less than that of its existing working channel, the base station initiates a switch to the neighboring community's working channel. Upon joining the new community, the frame structure and other networking parameters and attributes are adjusted.

19 Claims, 4 Drawing Sheets

U.S. PATENT DOCUMENTS

| | | | |
|---|---|---|---|
| 2003/0117966 | A1 | 6/2003 | Chen |
| 2004/0072565 | A1 | 4/2004 | Nobukiyo et al. |
| 2004/0142699 | A1 | 7/2004 | Jollota et al. |
| 2004/0266351 | A1 | 12/2004 | Chuah et al. |
| 2004/0266376 | A1 | 12/2004 | Cowley et al. |
| 2005/0157676 | A1 | 7/2005 | Kwak et al. |
| 2005/0226201 | A1 | 10/2005 | McMillin |
| 2005/0239497 | A1 | 10/2005 | Bahl et al. |
| 2005/0245199 | A1 | 11/2005 | Batra et al. |
| 2005/0265283 | A1 | 12/2005 | Qi et al. |
| 2006/0013177 | A1 | 1/2006 | Saito |
| 2006/0142021 | A1 | 6/2006 | Mueckenheim et al. |
| 2006/0199562 | A1 | 9/2006 | Taylor |
| 2007/0091998 | A1 | 4/2007 | Woo et al. |
| 2007/0111734 | A1 | 5/2007 | Beppu et al. |
| 2007/0117517 | A1 | 5/2007 | Hui et al. |
| 2007/0223419 | A1 | 9/2007 | Ji et al. |
| 2007/0243892 | A1 | 10/2007 | Mikami et al. |
| 2007/0248067 | A1 | 10/2007 | Banerjea et al. |
| 2008/0159258 | A1 | 7/2008 | Ji et al. |
| 2008/0165680 | A1 | 7/2008 | Chang |
| 2008/0205352 | A1 | 8/2008 | Chu et al. |
| 2009/0003291 | A1 | 1/2009 | Chu et al. |

OTHER PUBLICATIONS

Guangyu Pei, Mario Gerla, and Tsu-Wei Chen, "Fisheye State Routing: A Routing Scheme for Ad Hoc Wireless Networks," IEEE 2000.

Xiaoyan Hong, Kaixin Xu, and Mario Gerla, "Scalable Routing Protocols for Mobile Ad Hoc Networks," IEEE Network, Jul./Aug. 2002.

Atushi Iwata, Ching-Chuan Chiang, Guangyu Pei, Mario Gerla, and Tsu-Wei Chen, "Scalable Routing Strategies for Ad Hoc Wireless Networks," Research paper from UCLA.

L. Chu et al., "6-Address Scheme for TGs Mesh," IEEE 802.11-06/0841r5, Sep. 19, 2006, pp. 28.

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking," IEEE P802.11sTM/D0.03, Aug. 2006, pp. i-xvi, 1-176.

Chang, Soo-Young, "Waveform Modulated WRAN System," IEEE 802.22-05/0107r3, Jan. 16, 2006. See Office Action dated Feb. 1, 2011.

Chang, Soo-Young, "Analysis of Proposed Sensing Schemes," IEEE 802.22-06/0032r0, Mar. 6, 2006. See Office Action dated Feb. 1, 2011.

Freedman, Avi, "Slave Hierarchy for Better Usage of Regions not Interfered by the Master Subframe," IEEE 302.16 Broadband Wireless Access Working Group, http://ieee802.org/16, Nov. 8, 2006, pp. 6.

"Part 16: Air Interface for Fixed and Mobile Broadband Wireless Access Systems Improved Coexistence Mechanisms for License-Exempt Operation," Draft Amendment to IEEE Standard for Local and metropolitan area networks, LAN MAN Standards Committee, IEEE Computer Society, IEEE Microwave Theory and Techniques Society, IEEE P802. 16h/D1, Oct. 2006, i-xvi, 1-185.

Woo et al., U.S. Appl. No. 60/729,036, filed Oct. 21, 2005, 43 pages.

Chang, Soo-Young, U.S. Appl. No. 60/883,810, filed Jan. 7, 2007, 26 pages.

Dynamic Frequency Hopping Community, IEEE 802.22-06/0113r0, Jun. 2006, pp. 1-61.

Chang, Soo-Young; Spectral Correlation Sensing for Detection of Incumbent User Signals for Wireless Rural Area Networks (WRANs) and Other Systems/Applications; article; U.S. Appl. No. 60/883,810; 26 pps, 2007.

US 8,285,297 B2

FAIR CHANNEL USE IN A WIRELESS AREA NETWORK

RELATED APPLICATION

This application is a continuation of and claims the benefit of U.S. patent application Ser. No. 12/035,368 filed Feb. 21, 2008 and claims the benefit U.S. Provisional Patent Application No. 60/891,122 filed on Feb. 22, 2007. The disclosure of the foregoing U.S. patent application is specifically incorporated herein by this reference.

BACKGROUND OF THE INVENTION

1. Field of the Invention

Embodiments of the present invention relate, in general, to systems and method for wireless channel management and particularly to the fair usage of channels associated with a wireless network.

2. Relevant Background

Although broadband service has been available for some time, widespread access is still limited. In 2007 there were only 19.6 broadband subscribers per 100 inhabitants in the United States. While the United States ranked 15th in broadband access with respect to the number of inhabitants, the number of broadband subscribers is universally low when compared to the demand for broadband access.

The principle means by which broadband access is currently provided is either via cable or a Digital Subscriber Line ("DSL"). Both cable and DSL present significant barriers to the expansion of broadband access. For example, many are outside of the reach of DSL services. Cable service requires an extensive residential cable infrastructure and is not available to many residences. Lastly, a significant portion of those demanding broadband access feel that the cost of such access is prohibitive.

As an alternative to DSL or cable, the Institute of Electric and Electronics Engineers ("IEEE") developed and promoted a wireless broadband standard. IEEE standard 802.16 defines the Wireless Metropolitan Area Network ("WirelessMAN") air interface specification (also known as the IEEE WirelessMAN standard). This wireless broadband standard is new in comparison to the more mature standards such as 802.11 used for Wi-Fi networks commonly seen in homes and businesses. However, the 802.11 standard is primarily used for small local area networks while the 802.16 standard is designed to be used as a means of allowing wireless broadband access to a larger area as an alternative to cable and DSL connections.

The initial goal of 802.16 is to implement a set of broadband wireless access standards for WirelessMANs. To this end, much of the focus of 802.16 is on the "last mile" that would allow fixed and mobile wireless substations to connect to the fixed wireless base stations ("BSs"), thus allowing the delivery of high-speed Internet connections to the customer.

Because of its wireless nature, WirelessMAN can be faster to deploy, easier to scale, and more flexible, thereby giving it the potential to serve customers not served or satisfied by existing broadband services. WirelessMAN is similar to cellular systems in that it uses BSs that service a radius of several miles. The BS may be on a tower or reside on a tall building or elevated structure. The signal generated from these BSs is routed via standard Ethernet cable directly to a single computer, a hot spot or a wired Ethernet LAN. As will be recognized by one skilled in the relevant art, each BS can possess a transmitter and receiver of some form as well as a machine capable of executing instructions embodied as software. These software instructions can be stored on the BS in memory or conveyed to the BS via a wired link.

For the purposes of the present invention, consider the following definitions.

WirelessMAN-CX is the designation used to describe the realization that adds coordinated coexistence mechanisms to systems operating below 11 GHz in non-exclusively assigned or non-exclusively licensed bands.

WirelessHUMAN is the designation used to describe the realization that adds uncoordinated coexistence mechanisms to systems operating below 11 GHz in non-exclusively assigned or non-exclusively licensed bands.

Coexistence Signaling Interval ("CSI") is a predefined time slot not associated with the CXCC (coexistence control channel), used for coexistence signaling purposes between systems which may have different physical layers ("PHYs"). This technique uses power keyed energy symbols and RSSI (receive signal strength indicator) detection, by a BS to contact its coexistence neighbor BS through one or more coexistence neighbor sub stations ("SSs") in the common coverage area.

Operation Coexistence Signaling Interval ("OCSI") includes all the CSIs other than signal intervals periodically reallocated to OBSs (operating base stations).

Initialization Coexistence Signaling Interval ("ICSI") is the periodically appointed CSI specially used by an Initializing Base Station ("IBS") to contact its neighbor OBS. When the IBS gets the OCSI allocation and starts the operating stage, it will cease from using the ICSI.

By positioning several BSs within a metropolitan area, users can move throughout the area without loss of signal. For example, a user may be connected to the Internet via an 802.11 hot spot at work and then, when undocked, use 802.16 while roaming the city or traveling to the suburbs. One portion of the 802.16 standard (802.16h) provides procedures and improved coexistence mechanisms for license-exempt operation.

These standards, however, fail to address what systems (also referred to herein as BSs and cells) working in a congested channel environment should do when channels are identified with fewer working systems than anticipated. Furthermore, 802.16h does not provide methods to avoid channel switching collisions nor can it guarantee fair channel usage when a system switches to a new working channel.

Consider the example shown in FIG. 1. FIG. 1 shows a configuration of 802.16h BSs with overlapping coverage, as would be known in the prior art. In this example, system 1 110, system 2 115, and system 3 120 operate on channel 1. System 4 125, system 5 130, system 6 135, and system 7 140 operate on channel two. Thus channel 1 is associated with three systems and channel 2 is associated with two instances of 2 systems. In this example three separate communities initially exist, community 1 150 comprising systems 6 and 7, community 2 160 comprising systems 1, 2 and 3, and community 3 170 comprising systems 4 and 5. Assume that system 5 130 ceases to operate or ceases to interfere with system 4 125. In that scenario channel 2 is, in the instance of community 3 170, associated with a single system, system 4 125 while neighboring system 3 120 in community 2 160 is using channel 1 and is associated with two other systems. The prior art fails to address this disparity in congestion within a working channel of neighboring systems and neighboring communities.

SUMMARY OF THE INVENTION

Embodiments of the present invention provide the means for a BS in a wireless community that is working in a congested channel to switch to a channel that is associated with less working systems (BSs) than those working in the congested channel. Furthermore, and according to another embodiment of the present invention, a priority-based back-off mechanism is disclosed to resolve switching collisions. As a result, channel usage under 802.16 is fairer when a BS switches to a new channel.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention, a BS in the process of attempting to switch to a new channel generates a plurality of back-off periods prior to the channel switching taking place. A higher priority (smaller back-off period) is allocated to systems based on the degree of working channel congestion. A BS operating on a more congested channel will generate shorter back-off periods. Accordingly, the back-off period for a BS operating in a more congested working channel will expire first causing that BS to have priority in switching to a newer, less congested channel.

According to one embodiment of the present invention, when a new free (or less congested) channel is detected, and the working channel of a BS is crowded, the BS can switch to the newly identified free channel. The BS effecting the switch, the switching station, can request that its neighbors in the original community delete its existence from their coexistence neighbor list using a coexistence protocol ("CXP") message. Also, and in response to receiving a CXP message from the switching BS, the coexisting neighbors in the new community can negotiate with the switching BS to update their frame structure and operating coexistence signal interval ("OCSI") after the requesting BS switches to the newly identified channel. Furthermore, the switching station can send a message to its new coexisting neighbors to update their coexistence lists once the switch has taken place.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
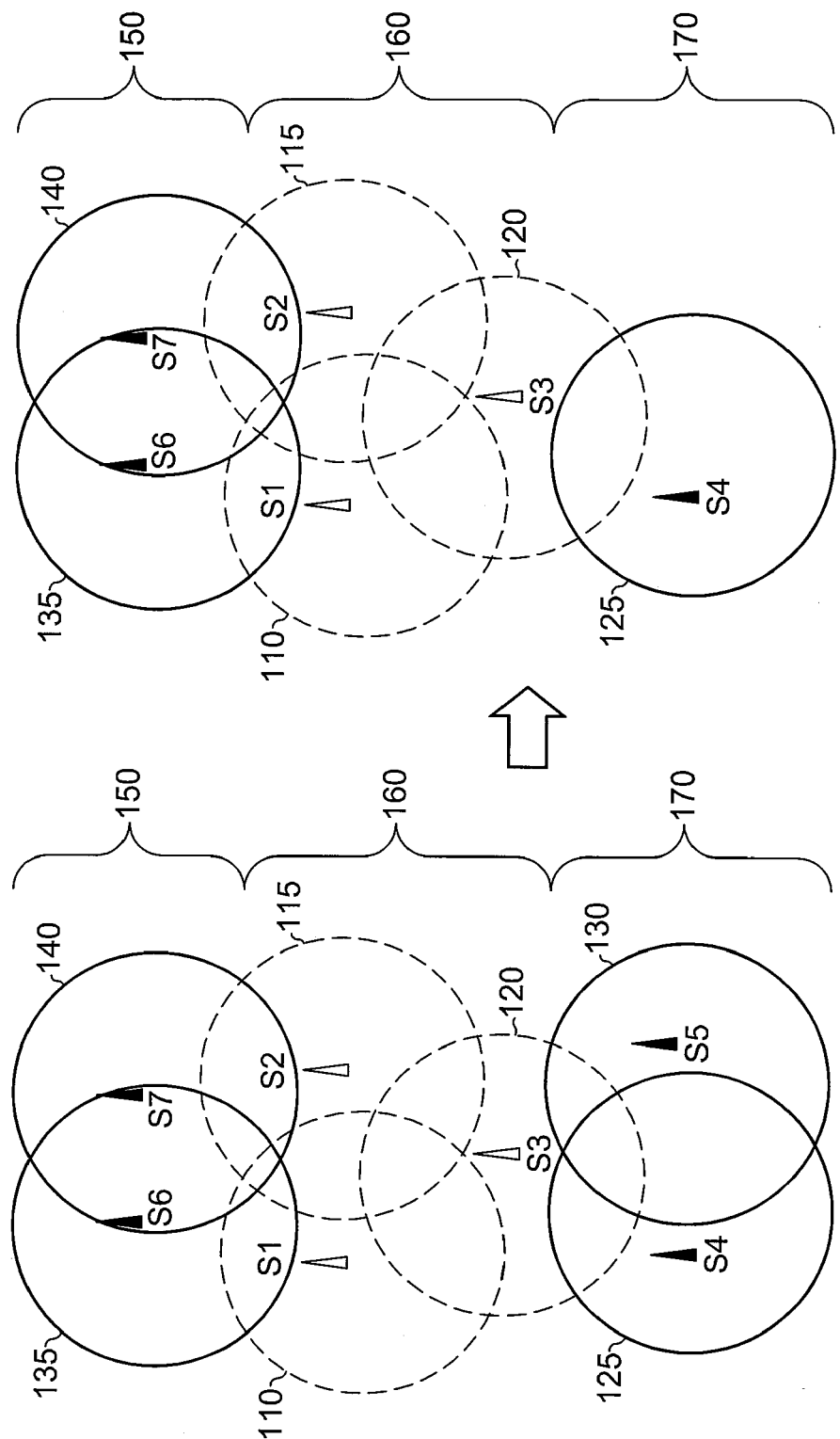
FIG. 1 shows a plurality of BSs and their associated overlapping wireless service areas as known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Disclosed herein are methods and systems for fair channel use in a metropolitan area network. According to one embodiment of the present invention a BS associated with a wireless community identifies that the working channel of a neighboring wireless community is less congested. Upon determining that the congestion on the neighboring community is less than that of the existing working channel, the BS initiates a working channel switch. Once the switch is complete, the BS sends a message to its old community to remove its identity from that community's coexistence list and sends another message to add its identity to the new community's coexistence list.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
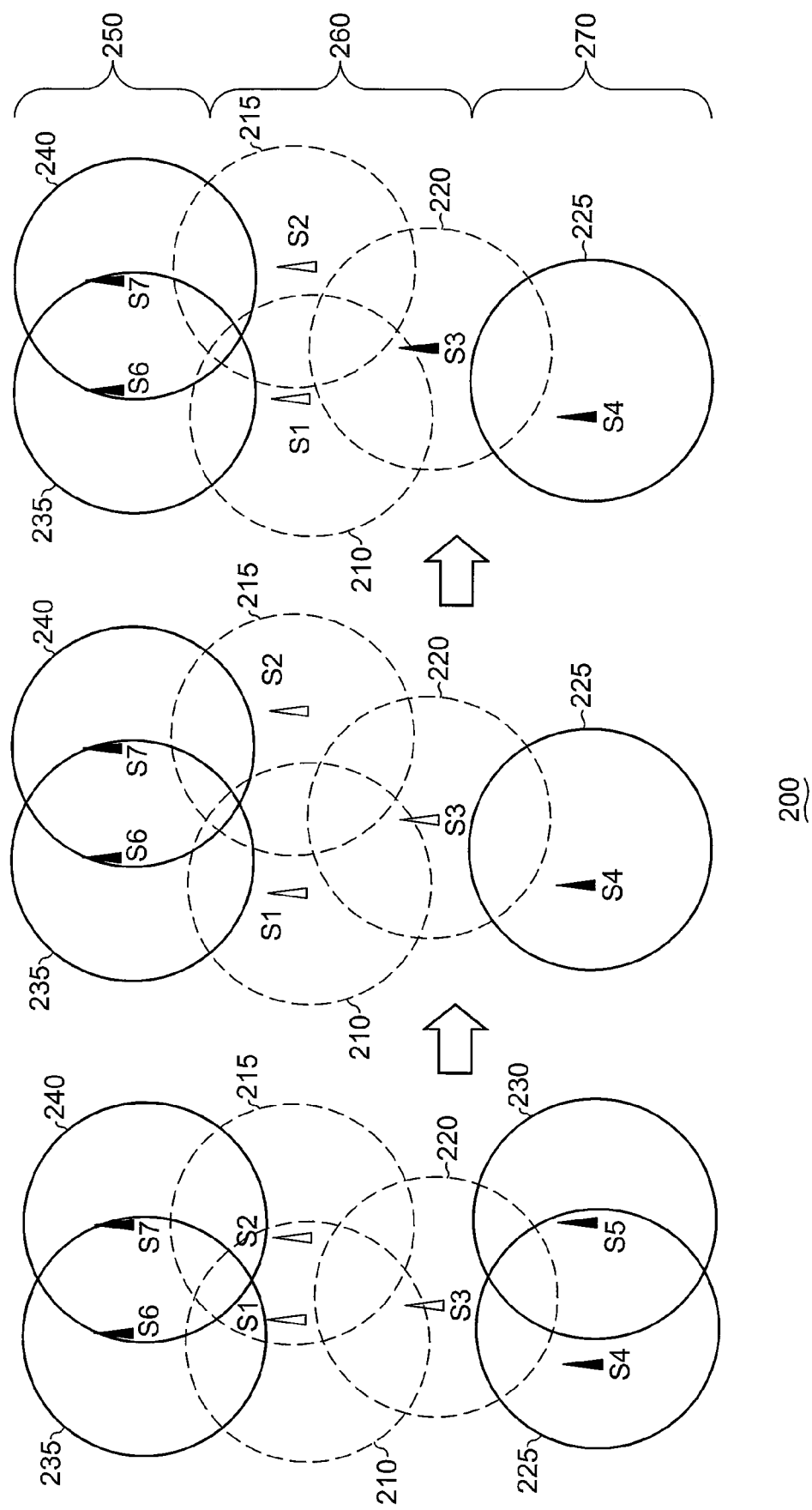
FIG. 2 shows a plurality of BSs and their associated overlapping wireless service areas in which, subsequent to the removal of one of the BSs from service, one of the remaining BSs switches working channels according to an embodiment of the present invention.

FIG. 2 shows a plurality of overlapping wireless networks in which a BS switches from one working channel to another working channel according to one embodiment of the present invention. The wireless network 200 shown in FIG. 2 initially comprises 7 wireless service areas or systems. Each wireless system is associated with a BS and a plurality of consumer premise equipments ("CPEs") (not shown).

Subsets of the wireless systems called communities can operate on the same working channel. To do this, each system within a community must time multiplex to share the available bandwidth of a working channel. Thus the more BSs associated with a particular working channel in a community, the more congested the working channel becomes.

According to one embodiment of the present invention, a BS (system) that is associated with a community monitors the congestion of the channels of neighboring community working channels to determine whether a switch to that community, and thus working channel, would result in less congestion. FIG. 2 depicts three wireless network communities 250, 260, and 270. Moving left to right, FIG. 2 shows a BS switching working channels subsequent to the recognition that a neighboring working channel is less congested. As shown on the left side of FIG. 2 the network is composed of 7 wireless systems. The first community 250 is comprised of system 6 235 and system 7 240. The second community 260 is comprised of system 1 210, system 2 215 and system 3 220, and the third community is comprised of system 4 225 and system 5 230.

According to this example of the present invention, one of the wireless systems, system 5 230 ceases to operate. Thus, as shown in the center of FIG. 2, community 3 is comprised of only system 4 225. Community 2 260 continues to have 3 systems and community 1 250 continues to have 2 systems. As the number of systems associated with each community determines the degrees of congestion of the working channel, both communities 1 250 and 2 260 have a more congested working channel than community 3 270.

According to one embodiment of the present invention, each system within the wireless network continuously (or periodically) monitors the degree of congestion of working channels of neighboring systems that are not associated with the same community. For example, system 1 210 neighbors system 2 215, system 3 230, system 6 235, and system 7 240. System 2 215 and system 3 220 are associated with the same community as system 1 210 so the degree of congestion of their working channel is identical to that of system 1's working channel. But system 6 235 and system 7 240 are associated with a different community and thus a different working channel.

According to one embodiment of the present invention, members of the second community 260 would recognize that their working channel is more congested than that of the working channel associated with community 1 250 and of the working channel associated with community 3 270. The degree of congestion of community 1 250 is however more than that of the degree of congestion of community 3 270. According to one embodiment of the present invention, systems within a community share channel congestion information to identify the system in a neighboring community with the relatively least congested working channel so as to determine what system should attempt to switch channels.

Upon recognizing that the congestion of community 3 270 is less than that of community 2 260, one of the systems associated with community 2 260 initiates a working channel switch from the channel associated with community 2 260 to that of community 3 270. As shown on the right most portion of FIG. 3, community 1 250 remains comprised of system 6 235 and system 7 230. Community 2 260 is now comprised of system 1 210 and system 2 215 and community 3 270 is comprised of system 4 225 and system 3 220. Each community is associated with an equal number of systems resulting in an equal degree of congestion on their respective working channels.

Figure 3:
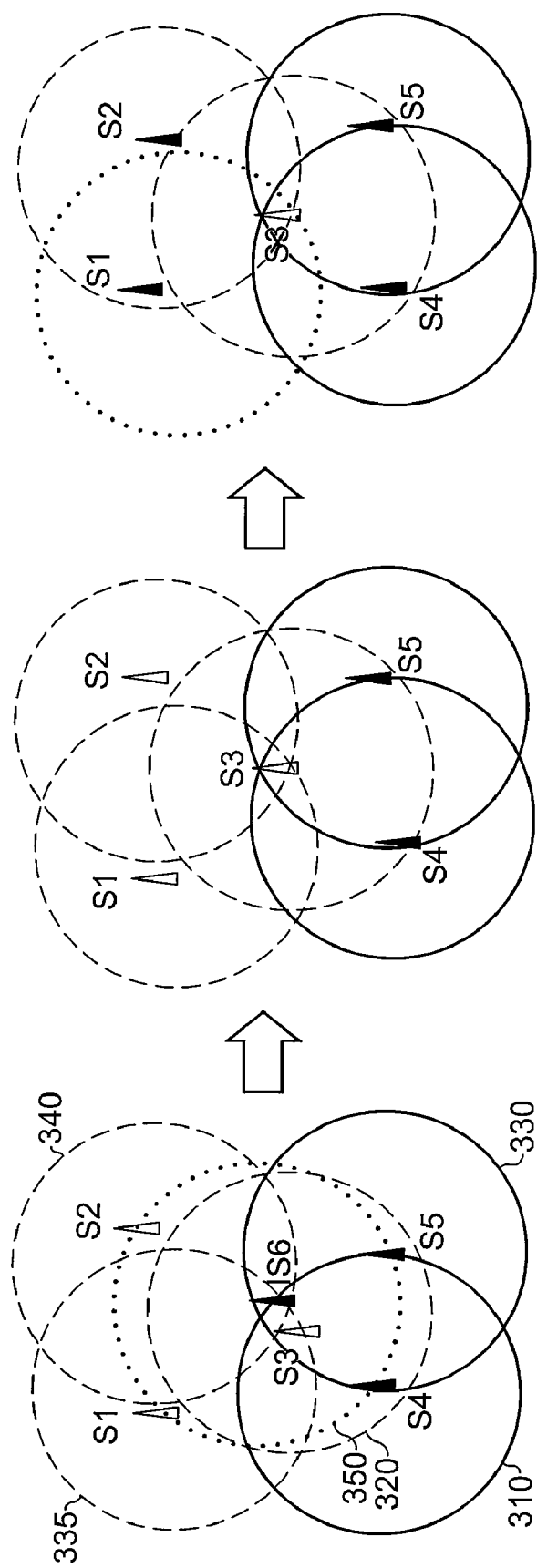
FIG. 3 shows a plurality of BSs and their associated overlapping wireless service areas in which an embodiment of the present invention resolves BS switching collisions as BSs attempt to switch to a less congested working channel.

FIG. 3 shows another wireless network comprised of a plurality of wireless systems in which a system switches to an idle working channel based on existing channel congestion, according to one embodiment of the present invention. As in FIG. 2, FIG. 3 shows a wireless network channel usage switching of a single network 300 as channel usage changes from left to right.

In the example shown in FIG. 3, three communities are again shown. Community 1 is comprised of system 1 335, system 2 340 and system 3 320. System 2 is comprised of a single system, system 6 350. System 3 is comprised of system 4 310 and system 5 330. Note that all 7 systems overlap with each other system to some extent. As shown in the center portion of FIG. 3, system 6 350 ceases to operate making its working channel idle. Each of the remaining systems therefore identify the idle channel as one which is less congested and therefore a ripe target with which to switch.

According to one embodiment of the present invention, back-off periods are used to establish a switching priority. According to the present invention, once a less congested or idle channel has been identified, a system initiates a back-off procedure. This procedure includes generating back-off periods. These periods are associated with the degree of congestion on which the system operates. Back-off periods represent a period of time between working channel use. Thus a system operating on a working channel that is more congested will possess a smaller back-off period than one that is operating on a channel that is less congested. According to one embodiment of the present invention, a system can initiate a switch after the expiration of the back-off period. Thus those systems operating in a more congested working channel will be more likely to switch than those working on a less congested channel.

Once the channel associated with system 6 350 goes idle, all of the remaining systems will recognize that a free, less congested channel exists and therefore begin the back-off procedure. Each system associated with community 1 will possess a back-off period that is less than that associated with community 3. Thus one of the members of community 1 will initiate switching to the idle working channel prior to any of the systems associated with community 3. During the back-off procedure, each system continues to monitor the congestion of the target channel. Upon realization that a switch has occurred, each on-going back-off procedure terminates.

Once the back-off procedure has been terminated, each system reassesses the degree of congestion of the neighboring system's working channel to determine whether a switch is warranted. As shown in the right most portion of FIG. 3, system 1 335 initiates a switch to the idle channel resulting in a single system community. System 2 340 and system 3 320 remain a community as do system 4 310 and system 5 330.

Note that in the previous example members of community 1 could have initiated the switch to the idle channel. Assuming that all three systems recognize the availability of the idle channel at the same time, a collision may occur in the switching process. To eliminate this situation, a random number is assigned to each system upon the initiation of the back-off procedure and used to break any possible collisions.

According to another embodiment of the present invention, the system that switches working channels can send a message request to each of its neighboring systems to either delete its identity from their coexistence list (i.e. the leaving community) or add its identity to their coexistence list (i.e. the arriving community). Similarly, upon arrival into the new community and working on a new working channel, the newly arrived system can send a coexistence protocol message to the other systems operating on the working channel to negotiate frame structure and OCSI.

Figure 4:
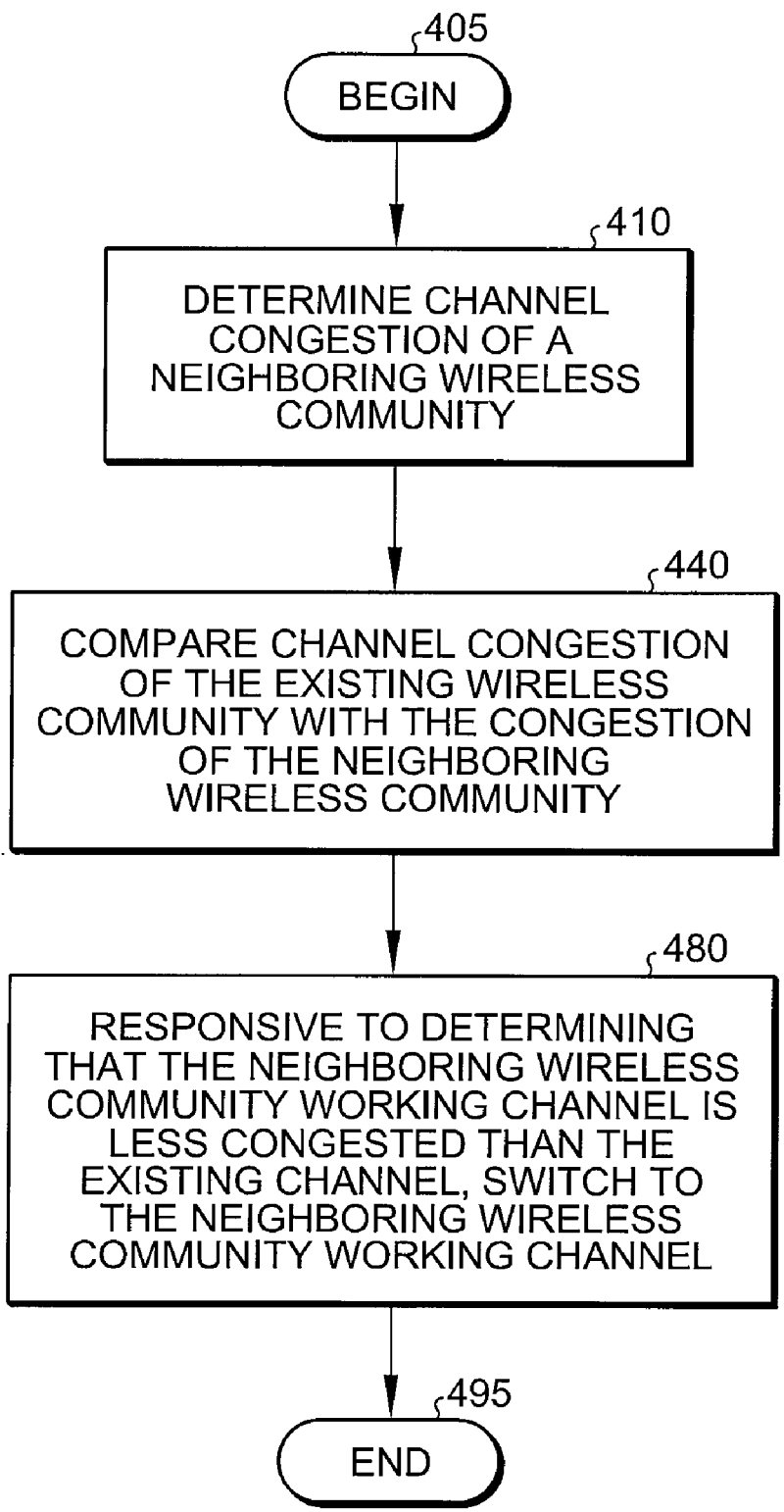
FIG. 4 is a flowchart of a method for fair channel use in a wireless network according to one embodiment of the present invention.

FIG. 4 is a flowchart illustrating a method of implementing an exemplary process for fair channel usage in a wireless community according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As shown in FIG. 4 the switching process begins 405 with determining 410 channel congestion of one or more neighboring wireless communities. As was previously discussed, each community operates on a separate working channel. The more systems (BSs) operating on that working channel, the more congested that channel becomes.

At substantially the same time, the degree of the congestion of the channel on which the system is operating is ascertained. The degree of congestion of the existing working channel and the degree of congestion of the neighboring working channel are then compared 440 to determine whether there exists a neighboring system of a different wireless community that possesses a lower degree of congestion.

Responsive to the determination that a neighboring system in a different wireless community operating on a different working channel possesses a lower degree of congestion, the system of the first community switches 480 channels so as to operate on the working channel of the neighboring community. According to one embodiment of the present invention, the switching process includes generating a back-off period so as to establish a priority system should a collision exist with other systems attempting to simultaneously switch to the same working channel.

The present invention describes systems and methods for fair channel usage in a wireless network. While described with respect to a metropolitan area network, the principles described above with respect to the present invention can apply to any type of wireless network that involves multiple systems (BSs) operating on the same working channel.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment.

While there have been described above the principles of the present invention in conjunction with fair channel usage, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:
1. A method for reallocation of overlapping channel usage for a base station (BS) in a wireless network having at least two communities wherein each community is formed from two or more overlapping cells, wherein each community is associated with an operating channel, wherein each cell includes a respective BS and a plurality of consumer premise equipments ("CPEs") associated with the respective BS, and wherein a cell includes the BS, the method comprising;
    monitoring for the cell within a first community an operating channel associated with a neighboring community;
    ascertaining a degree of congestion of the operating channel associated with the neighboring community;
    comparing the degree of congestion of the operating channel associated with the neighboring community with congestion of an operating channel associated with the first community;
    switching for the cell to the operating channel associated with the neighboring community responsive to the degree of congestion of the operating channel associated with neighboring community being less than congestion of the operating channel associated with the first community; and
    initiating a back-off procedure including generating a back-off period for the cell within the first community prior to switching to the operating channel associated with the neighboring community, wherein the back-off period is smaller for more congested channels than less congested channels.

2. The method of claim 1 further comprising identifying the operating channel associated with the neighboring community as a new working channel for the cell responsive to verifying congestion of the operating channel associated with the neighboring community is less than congestion of the operating channel associated with the first community subsequent to switching to the operating channel associated with the neighboring community.

3. The method of claim 2 wherein switching includes updating, for the cell, the new working channel of the cell to other cells associated with the neighboring community.

4. The method of claim 1 wherein switching includes requesting coexistence neighbor cells of the first community to delete the cell from their coexistence neighbor list.

5. The method of claim 1 wherein switching includes requesting coexistence neighbor cells of the neighboring community to add the cell to their coexistence neighbor list.

6. The method of claim 4 wherein requesting includes using a coexistence protocol message.

7. The method of claim 5 wherein requesting includes using a coexistence protocol message.

8. The method of claim 1 wherein switching includes negotiating, for the cell of the first community, a new frame structure with cells associated with the neighboring community.

9. The method of claim 1 wherein switching for the cell to the operating channel associated with the neighboring community is responsive to the back-off period of the back-off procedure expiring.

10. The method of claim 1 wherein initiating the back-off procedure includes measuring congestion of the operating channel associated with the neighboring community and wherein initiating includes, responsive to identifying another cell switching to the neighboring community prior to the expiration of the back-off period, terminating the back-off procedure.

11. The method of claim 1 wherein switching includes negotiating, for the cell of the first community, a new operating coexistence signal interval with cells associated with the neighboring community.

12. A method to operate an apparatus in a system for fair working channel use in a wireless network, wherein the network includes a plurality of communities and wherein each community includes a community working channel and at least one cell operating on the community working channel, wherein a first community including a first plurality of cells operating on a first working channel, and wherein a second community including a second plurality of cells operating on a second working channel wherein the first plurality of cells is larger than the second plurality of cells; the method comprising:

associating with a switching cell associated with the first community and operating on the first working channel wherein the switching cell determines a first congestion level associated with the first working channel and a second congestion level associated with the second working channel, and responsive to the first congestion level being greater than the second congestion level, the switching cell switches from operating on the first working channel to operating on the second working channel, wherein the switching cell initiates a back-off procedure, the back-off procedure including generating a back-off period, and wherein the switching cell switches from operating on the first working channel to operating on the second working channel upon expiration of the back-off period, and wherein the back-off period is smaller for more congested channels than less congested channels.

13. The method of claim 11 wherein the switching cell requests to be deleted from the coexistence neighbor list of the first community responsive to switching to operating on the second working channel.

14. The method of claim 11 wherein the switching cell requests to be added to the coexistence neighbor list of the second community responsive to switching to operating on the second working channel.

15. The method of claim 11 wherein the back-off procedure initiated by the switching cell terminates responsive to a new cell operating on the second working channel of the second community.

16. A consumer premise equipment (CPE) associated with a base station (BS) and configured for fair working channel use in a wireless network; the CPE comprising:

a machine for executing instructions embodied as software;

a memory for storing the instructions embodied as software; wherein the software comprises a plurality of software portions, wherein:

one of said software portions is configured to determine or operate with the BS to determine a degree of congestion of a first working channel on which the base station is operating and congestion of a second working channel on which at least one other base station is operating;

one of said software portions is configured to compare or operate with the BS to compare the degree of congestion of the first working channel to congestion of the second working channel; and one of said software portions is configured to direct the CPE to switch from operating on the first working channel to operating on the second working channel responsive to congestion of the second working channel being less than the degree of congestion of the first working channel, wherein one of the software portions is configured to initiate or operate with the BS to initiate a back-off procedure, the back-off procedure including generating a back-off period wherein the software portion configured to direct the CPE to switch is executed upon expiration of the back-off period, and wherein the back-off period is smaller for more congested channels than less congested channels.

17. The CPE of claim 15 wherein the back-off procedure terminates responsive to discovery of new base stations or CPEs operating on the second working channel.

18. The CPE of claim 15 wherein responsive to the CPE operating on the second working channel one of said software portions is configured to request the CPE be deleted from the coexistence neighbor list of other base stations or CPEs operating on the first working channel.

19. The CPE of claim 15 wherein responsive to the CPE operating on the second working channel one of said software portions is configured to request the CPE be added to the coexistence neighbor list of other base stations or CPEs operating on the second working channel.

* * * * *